United States Patent [19]

Adam

[11] Patent Number: 4,718,600
[45] Date of Patent: Jan. 12, 1988

[54] VEHICLE HEATER

[75] Inventor: Willibald Adam, Ottobrunn, Fed. Rep. of Germany

[73] Assignee: Webasto-Werk W. Baier GmbH & Co., Gauting, Fed. Rep. of Germany

[21] Appl. No.: 938,831

[22] Filed: Dec. 8, 1986

[30] Foreign Application Priority Data

Dec. 13, 1985 [DE] Fed. Rep. of Germany ....... 3544023

[51] Int. Cl.$^4$ ............................................. G05D 23/00
[52] U.S. Cl. ................................. 237/2 A; 237/12.3 C
[58] Field of Search ...................... 237/12.3 C, 12.3 B, 237/12.3 A, 2 A, 12.3 R; 236/91 F; 126/110 B, 110 D

[56] References Cited

U.S. PATENT DOCUMENTS

| 2,949,106 | 8/1960 | Sunday | 237/12.3 C |
| 3,072,176 | 1/1963 | Sunday | 237/12.3 C |
| 3,690,549 | 9/1972 | Hardy | 237/12.3 C |
| 4,192,457 | 3/1980 | Easterly | 237/12.3 C |

Primary Examiner—Henry A. Bennet
Attorney, Agent, or Firm—Sixbey, Friedman & Leedom

[57] ABSTRACT

A vehicle heater, which contains a heating circuit, connected to an engine coolant circuit, with an auxiliary heating apparatus that is operable independent of the engine and a vehicle heat exchanger installed downstream from the heating apparatus. This heat exchanger, for example, radiates heat to the vehicle interior. With such a vehicle heater, in addition to a built-in temperature sensor, which detects the temperature of a heat exchange medium in the heating apparatus, another temperature sensor is provided, which detects the temperature in the output area of the vehicle heat exchanger. The temperature values detected with the two temperature sensors are then compared and a temperature difference value determined, which serves as characteristic magnitude for indicating the existance a heat requirement. If this temperature difference exceeds below a predetermined temperature difference value, a heat requirement exists in the heating circuit of the vehicle heater and the auxiliary heating apparatus is turned on. If, however, this predetermined temperature difference value is not reached or exceeded, the heating apparatus itself remains turned off, even though the turn-on temperature, on the basis of the temperature sensor provided in the heating apparatus, is reached, since, by comparison of the measured values of the two temperature sensors, it can be detected that no heat requirement exists in the heating circuit.

11 Claims, 1 Drawing Figure

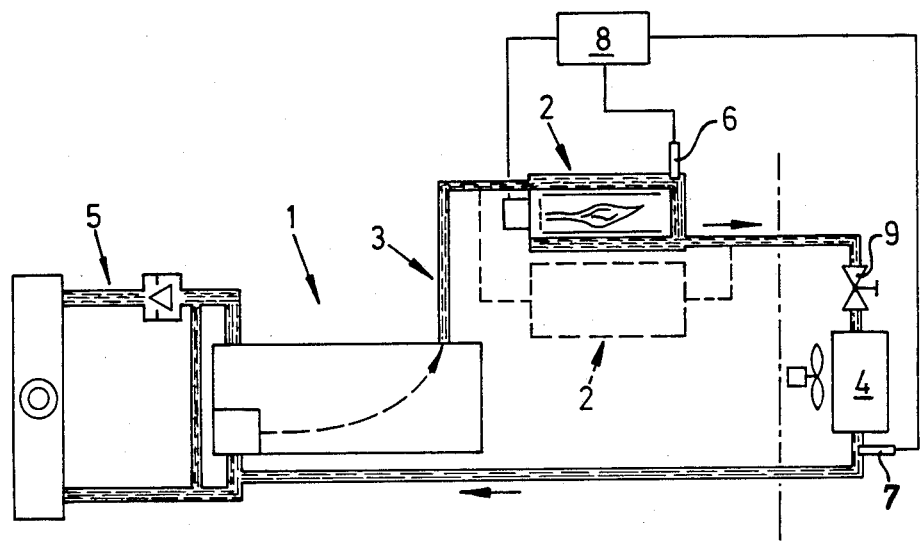

VEHICLE HEATER

DESCRIPTION

BACKGROUND & SUMMARY OF THE INVENTION

The invention relates to a vehicle heater which, in a vehicle heating circuit, is connected to the coolant circuit of the internal combustion engine, but is operable as an auxiliary heater independent of the engine, and is installed downstream of a vehicle heat exchanger. The vehicle heat exchanger radiates heat to the vehicle interior. The auxiliary heating apparatus, independent of the engine, has a built-in temperature sensor for detection of the temperature of the heat exchange medium of the heating apparatus and for controlling the heating apparatus.

In the case of vehicle heaters of the above-named type which throttle the rate of flow of coolant in the heating circuit, optionally until cutoff, the coolant temperature in the heating circuit outside the internal combustion engine can drop, which can result in the engine independent heating apparatus, provided in a so-called in-line installation, being turned on and put into operation, although there is actually only a small heat requirement or none at all. Since the heating apparatus, independent of the engine, works in such cases and produces heat, this heat cannot be removed by the heating circuit of the vehicle and the heating apparatus can reach critical operating conditions, so that, for example, safety devices, such as a temperature safety device or the like, are tripped.

Therefore, a primary object of the present invention is, to overcome the difficulties mentioned above and, thereby, to improve a vehicle heater of the type initially mentioned so that, the engine independent heating apparatus, is activated or turned on only if there is actually a heat requirement in the heating circuit of the vehicle heater.

In this connection, according to the invention a vehicle heater of the type initially mentioned is distinguished by the fact that a temperature sensor, in addition to the built-in sensor, is provided on the vehicle heat exchanger for detecting the output temperature, and that the magnitude of a temperature difference value determined from the temperature values detected by the temperature sensors can be utilized as a control parameter.

Thus, since, with the vehicle heater according to the invention, the temperature of the liquid in the heating circuit is detected at the output of the vehicle heat exchanger, by comparison of the value from the temperature sensor for the detection of the heat exchange medium temperature in the heating apparatus with the temperature in the output area of the vehicle heat exchanger, it is possible to detect precisely whether or not a decrease in temperature occurred through the vehicle heat exchanger. If this established value of temperature difference does not exceed a predetermined value, this means that a very small or no heat requirement at all exists, so that the auxiliary heating apparatus, is not turned on or the heating-circuit connected.

Thus, if a predetermined temperature difference between the two temperature sensors is reached or is lower, a heating requirement exists and the auxiliary heating apparatus, is put into operation.

With the vehicle heater according to the invention, the auxiliary heating apparatus is kept from going into operation if the temperature sensor provided on the auxiliary heating apparatus for detection of the temperature of the exchange medium goes below the turn-on temperature for the heating apparatus, but still no temperature decrease or only a very small temperature decrease takes place in the heating circuit of the vehicle heater. In this way, critical operating conditions of the auxiliary heating apparatus, especially in the case of an in-line installation in a vehicle heater, are avoided.

In accordance with another aspect of the vehicle heater according to the present invention, the auxiliary heating apparatus remains in a stand-by mode as long as a predetermined threshold value for the temperature detected by the additional, heat exchanger associated, temperature sensor is not reached or exceeded. By this means the condition of the vehicle heater at which, for example, a valve located upstream of the vehicle heat exchanger is cut off, is taken into account so that the liquid on the intake side and the output side of the heat requirement cannot be made with sufficient reliability solely by consideration of the temperature difference between the two temperature sensors. Therefore, in this case, a threshold value is preset for the temperature detected by the second temperature sensor.

In an advantageous further development according to the invention, the output of the additional temperature sensor is connected to a control device for control and regulation of the engine independent heating apparatus, and the evaluation takes place directly with the help of this control device.

Further, the predetermined threshold value for the temperature detected by the additional temperature sensor can be preset in the control device, so that it is only necessary to connect the additional temperature sensor on the output area of the vehicle heat exchanger to the control device of the heating apparatus. As a result, the installation expense, even in the case of a retrofit installation, can be minimized.

Also, according to the invention, the design of the vehicle heater is also made so that the predetermined threshold value for the temperature detected by the additional temperature sensor is considered only if the heating apparatus has cut off once, to guarantee a heating operation with the use of the heating apparatus, even in the case of a cold internal combustion engine.

These and further objects, features and advantages of the present invention will become more obvious from the following description when taken in connection with the accompanying drawings which show, for purposes of illustration only, single embodiments in accordance with the present invention.

BRIEF DESCRIPTION OF THE DRAWING

The single FIGURE of the drawing shows, in a diagrammatic view, a vehicle heater with a heating circuit, which is connected to engine coolant circuit.

DETAILED DESCRIPTION OF THE PREFERRED EMBODIMENT

In the drawing, the vehicle heater as a whole is identified by 1, which has a heating circuit identified as a whole by 3. In the heating circuit is installed a heating apparatus 2, that functions as an auxiliary heater independent of the engine. Heating apparatus 2 preferably is a water heating apparatus and, as shown by continuous lines in the single figure, can be connected in series with a vehicle heat exchanger 4 in heating circuit 3. Alternatively, heating apparatus 2 can be connected in parallel with heat exchanger 4. Heating apparatus 2 has a temperature sensor 6 which detects the temperature of a heat exchange medium in heating apparatus 2 and, as a function of this temperature, controls the operating characteristics of heating apparatus 2. A control device 8, which is used to control the heating apparatus 2 is also connected with sensor 6. On the output area of vehicle heat exchanger 4, another temperature sensor 7 is provided whose output is also connected to control device 8, in the illustrated embodiment. With the help of control device 8, the temperature difference between the two temperature values detected by temperature sensors 6 and 7 is determined and, as a function of this determined temperature difference, turning on or cutting off of heating apparatus 2 takes place. If a predetermined temperature difference value is reached or is lower, the heating apparatus is turned on, since a heating requirement exists and heat can be delivered to the vehicle interior by vehicle heat exchanger 4.

Of course, the outputs of the two temperature sensors 6 and 7 can be connected to one another independently of control device 8, to determine and deal with a temperature difference and a corresponding influencing of the operation of the heating apparatus.

If, for example, a valve 9, shown in the figure, is closed on the input side of vehicle heat exchanger 4, or if the flow in the heating circuit is throttled, the predetermined temperature difference value is exceeded but the heating apparatus 2, is not turned on, although actually a turn-on temperature, for example measured by temperature sensor 6 in heating apparatus 2, is reached or exceeded, because, with the throttled or closed flow through heat exchanger 4, no requirement for heat from heating apparatus 2 exists and it does not need to be put into operation. If the heating apparatus 2 were put into operation, critical operating conditions could result, which could lead to a forced shut-off of heating apparatus 2.

If processing of the outputs of the temperature sensors takes place by control device 8 of heating apparatus 2, advantageously, a predetermined threshold value is also preset for the temperature detected by the other temperature sensor 7 with the help of control device 8. This predetermined threshold value is used to keep heating apparatus 2, in operation in a stand-by mode independently of the detected temperature difference value since, with valve 9 closed, the liquid in heating circuit 3 is cooled on both sides of vehicle heat exchanger 4, so that the temperature difference measured does not clearly indicate the existance of a heat requirement. However, in this condition of vehicle heater 1, care must be taken that heating apparatus 2 has cut off once, so that a heating operation with heating apparatus 2, is assured even with a cold engine. In the stand-by mode, the heating device, as a whole, together with the control device and all other components, can be activated by a single signal of a temperature sensor. For example, the heating device is supplied with power, the burner is switched off, but the blower is operating as well as possibly a circulating pump.

In summary, the invention provides a possibility, with which an engine independent auxiliary heating apparatus 2 can be used, for example, in a vehicle heater 1 that is provided in an in-line installation with a heating circuit 3 yet critical operating conditions are avoided.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Vehicle heater with an auxiliary heating apparatus that is operable independent of the engine, said heating apparatus being disposed in a vehicle heating circuit, which contains a vehicle heat exchanger which radiates heat to the vehicle interior, downstream of the heating apparatus, said heating circuit being connected to an engine coolant circuit, wherein a temperature sensor in the heating apparatus, is provided for detecting the temperature of a heat exchange medium acted upon by the heating apparatus, another temperature sensor is provided for detecting the temperature at an output area of the vehicle heat exchanger and wherein control means is provided for controlling operation of the heating apparatus based upon a temperature difference value determined from the temperature values detected by said temperature sensors.

2. Vehicle heater according to claim 1, wherein said control means is operable for turning on said heating apparatus when the determined temperature difference value is below a predetermined temperature difference value.

3. Vehicle heater according to claim 2, wherein the heating apparatus, remains in a stand-by mode as long as a predetermined threshold value for the temperature detected by the other temperature sensor is not reached or exceeded.

4. Vehicle heater according to claim 3, wherein the output of the other temperature sensor is connected to said control means.

5. Vehicle heater according to claim 4, wherein the control means is provided with means for presetting said predetermined threshold value for the temperature detected by the other temperature sensor.

6. Vehicle heater according to claim 5, wherein said control means is operable to implement said standby mode only after a cutoff of said heating apparatus has occurred at least once.

7. Vehicle heater according to claim 1, wherein the heating apparatus, remains in a stand-by mode as long as a predetermined threshold value for the temperature detected by the other temperature sensor is not reached or exceeded.

8. Vehicle heater according to claim 7, wherein the output of the other temperature sensor is connected to said control means.

9. Vehicle heater according to claim 8, wherein the control means is provided with means for presetting said predetermined threshold value for the temperature detected by the other temperature sensor.

10. Vehicle heater according to claim 9, wherein said control means is operable to implement said stand-by mode only after a cutoff of said heating apparatus has occurred at least once.

11. Vehicle heater according to claim 3, wherein said control means is operable to implement said stand-by mode only after a cutoff of said heating apparatus has occurred at least once.

* * * * *